April 30, 1940.  R. G. GOODYEAR  2,198,964
CONNECTOR
Filed Dec. 22, 1938  2 Sheets-Sheet 1
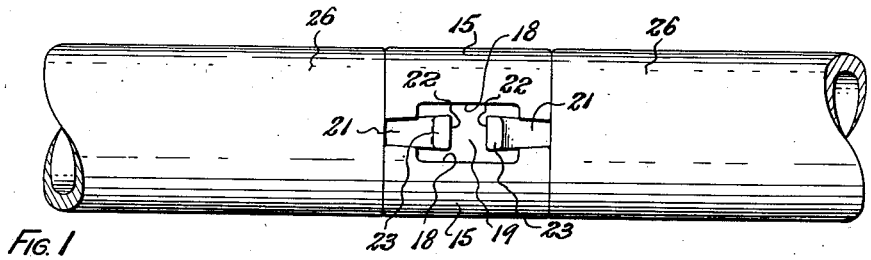
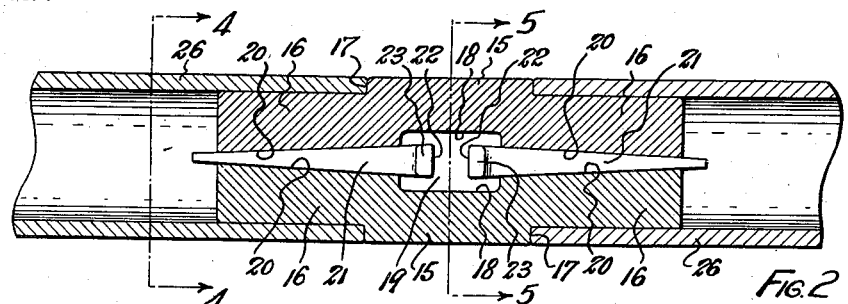
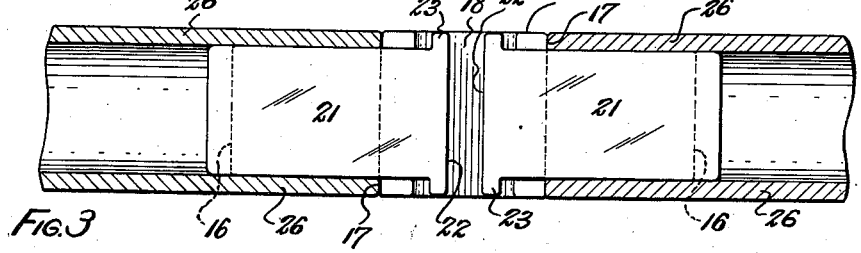
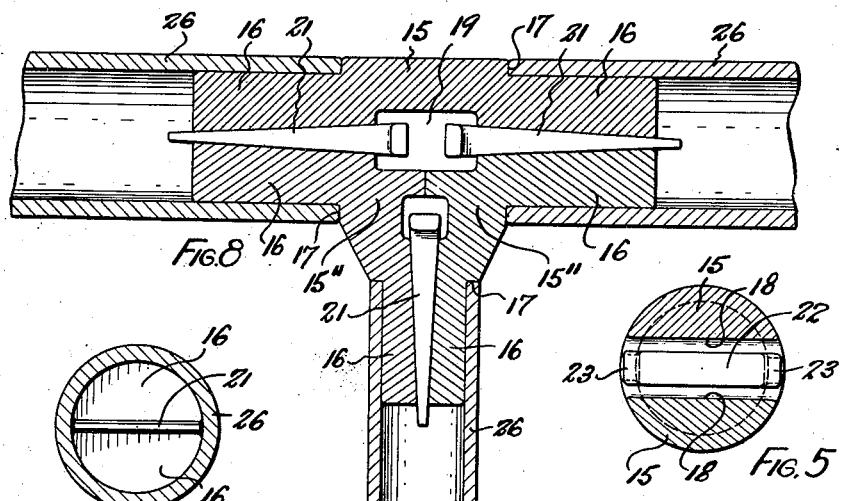
INVENTOR.
ROBERT G. GOODYEAR,
BY
ATTORNEY.

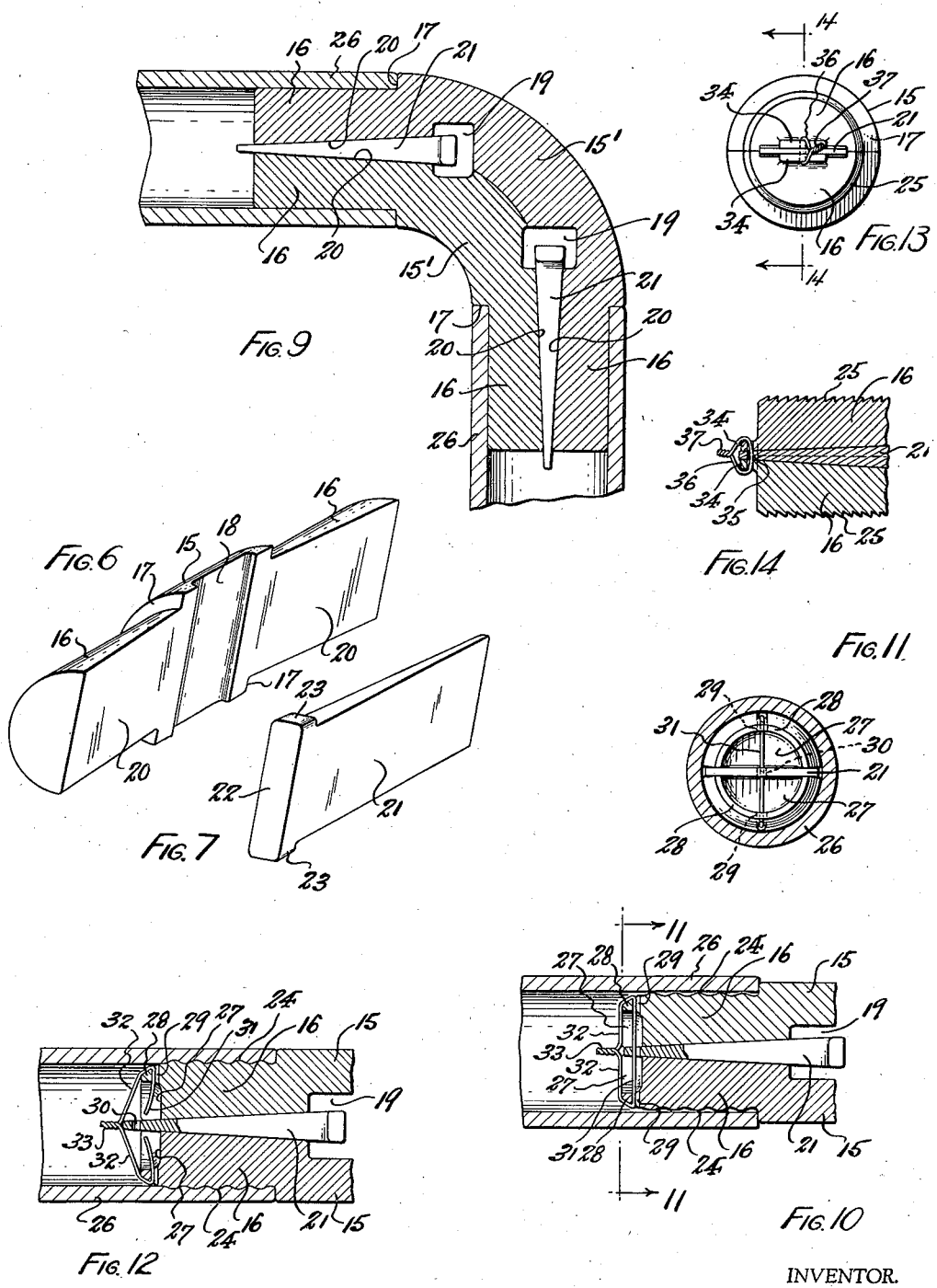

Patented Apr. 30, 1940

2,198,964

UNITED STATES PATENT OFFICE 2,198,964

CONNECTOR

Robert G. Goodyear, New York, N. Y.

Application December 22, 1938, Serial No. 247,195

7 Claims. (Cl. 287—54)

This invention relates to improvements in connector means for joining tubular elements in coupled together relation.

This invention has for an object to provide a novel connector means for securely joining tubular elements together in desired coupled relation; the same being especially adapted for coupling together tubular members used in the erection of various kinds of frame structures, hand rail structures, electrical bus bar assemblies, and in many other structures wherein it is required to join together the ends of tubular elements composing the same in whole or in part.

This invention has for another object to provide a novel coupling connector for the purposes mentioned comprising a plurality of associated relatively transversely movable elements having portions insertable into the ends of the tubular members to be joined, and intermediate drivable wedge means for transversely spreading the cooperating movable elements so as to expand or spread the insertable portions into strong gripping and frictionally bound relation to the ends of operatively engaged tubular members.

The invention has for a further object to provide a coupling connector, characterized as above stated, having means for retaining the parts thereof in normal initial assembled relation so as to form an easily handled and manipulatable connector unit; and retaining means being releasable merely by the driving movement of the wedge means when the connector unit is put to use.

Other objects of this invention, not at this time more particularly enumerated, will be understood from the following detailed description of the same.

Illustrative embodiments of this invention are shown in the accompanying drawings, in which:

Fig. 1 is a side elevation of the novel connector as operatively assembled in coupling relation to and between the ends of tubular members joined together thereby; Fig. 2 is a longitudinal sectional view of the same, the wedge devices being shown in elevation; Fig. 3 is a longitudinal sectional view in a plane at right angles to that of Fig. 2; Fig. 4 is a cross section, taken on line 4—4 in Fig. 2; Fig. 5 is a cross section, taken on line 5—5 in Fig. 2; Fig. 6 is a perspective view of one of the movable elements of the connector; and Fig. 7 is a perspective view of one of the wedge means of the connector.

Fig. 8 is a sectional view showing a T type of the novel coupling connector; and Fig. 9 is a sectional view showing an elbow type coupling connector.

Fig. 10 is a fragmentary sectional view showing one form and arrangement of means for releasably retaining the parts of the connector together as an assembled unit; Fig. 11 is a sectional view, taken on line 10—10 in Fig. 10; and Fig. 12 is a view similar to that of Fig. 10, but showing the retaining means released by the driven movement of a wedge means.

Fig. 13 is an end view of the connector, showing a modified form and arrangement of means for releasably retaining the parts thereof together as an assembled unit; and Fig. 14 is a longitudinal sectional view, taken on line 14—14 in Fig. 13.

Similar characters of reference are employed in the above described views, to indicate corresponding parts.

In a simple form of the novel connector adapted to join together tubular members of circular cross section in straight running alignment, the same comprises a pair of laterally opposed body members. Each body member possesses a midsection 15, preferably of substantially semi-circular cross-sectional shape and of radial projection approximating or exceeding the external radius of the tubular members to be joined, and integral with and projecting longitudinally from the respective ends of said mid-section 15 are gripper sections 16 also of substantially semicircular cross-sectional shape but of radial projection approximating the internal radius of the tubular members to be joined, thus providing, at the junctures of said gripper sections 16 and the ends of the mid-section 15, stop shoulders 17. Formed at and across the inner face of the mid-section 15 is a transverse channel or recess 18, to provide a central opening 19 to give access to the heads of the wedge means associated with and between the laterally opposed body members. Each gripper section 16 is provided at its inner side with an inclined wedge bearing face 20 corresponding in angular pitch to the angular pitch of the faces of the associated wedge means. Arranged between the opposed wedge bearing faces 20 of the opposed gripper sections 16 which extend from the respective ends of the mid-sections 15 of the body members are longitudinally disposed oppositely and outwardly directed wedge members 21, the head ends 22 of which lie within said central access opening 19. The bodies of said wedge members may substantially correspond in width to the width of said wedge bearing faces 20 of the gripper sections 16.

Preferably said wedge members 21 are provided adjacent to their head ends 22 with oppositely and laterally projecting ears or lugs 23 adapted to be exposed within the open sides of said access opening 19. The external semi-cylindrical surfaces of the gripper sections 16 may be smooth or, if desired, these surfaces may be suitably roughened, as e. g. by nurling, or by forming in connection therewith annular rugosities 24 (as shown in Figs. 10 and 12), or by providing the same with serrations 25, (as shown in Fig. 14). In most uses of the connector, the frictional grip of even the comparatively smooth surfaces of the gripper sections, when tightened home against the internal surface of the engaged tubular member by the laterally spreading action of the driven wedge members, will offer sufficient resistance to relative movement between these parts as to adequately prevent accidental loosening or separation thereof. When the gripping surfaces of said gripper sections 16 are roughened in any of the ways above mentioned, or in any other way the gripping action upon the tubular member walls is, of course, very greatly enhanced, which may be desirable when the connector is utilized in structure subject to strong stresses or strains and consequently greater risk of accidental loosening of the connector devices.

In the use of the novel connector, the body members and interposed wedge members being assembled together, with the latter retracted, to reduce the diameter of the associated gripping section ends to a size rendering such ends insertable into the open ends of opposed tubular members 26 to be joined or coupled, said gripping section ends are respectively entered within corresponding open ends of the tubular members 26, until the extremities of the latter are stopped against the stop shoulders 17. When the connector is thus engaged between the tubular members 26 to be joined, the operator, by any suitable means, drives home the wedge members 21, thereby moving the same endwise toward said tubular members 26 and between the opposed body members whereby the latter are caused to move or spread bodily apart. Such movement of the body members drives the gripper sections 16, between which the wedge members extend, laterally against the internal surfaces of the tubular member walls and into strong frictionally gripping relation thereto, thus binding the ends of said tubular members to the connector, so that the latter forms a strong coupling connection therebetween. The wedge members are so designed that their over all taper aproximates an angle of six degrees. Since an inserted wedge, the over all taper angle of which is not in excess of seven degrees, readily resists any tendency to back out, it is preferable that the taper angle of the wedge members should be within the limits of two to seven degrees, although, for many purposes wedge taper angles up to fifteen degrees may be utilized with substantially no tendency to retraction of the wedges under normal stresses. In order to assure a strong gripping engagement of the wedge faces with the bearing faces of the gripper sections 16, said wedge faces may be coated with a suitable adhesive coating sprinkled with grit, emery or like material whereby when the wedges are driven an exceedingly strong frictional resistance to retractive movement of the wedge members is set up.

It will be obvious that a very simple and easily manipulated and applied connector is provided for the intended purposes, wherein all screws or screw-threaded parts, nuts and bolts or other separable fastener devices are eliminated. Furthermore, the connector is of such form that it symmetrically conforms to contours of the tubular members joined thereby, thus eliminating all protuberances or projected parts, so that the like of the joined tubular member is unbroken, and a smooth external symetry is attained.

Should it be desired at any time to disjoin the ends of tubular members coupled together by the novel connector device of this invention, this may easily be done by applying a suitable tool against an ear or lug of the wedge members and then rapping the tool to drive back the wedge member so as to allow the gripper sections to move transversely inward and thus relax the grip thereof upon the ends of said tubular members.

As shown in Fig. 9, the connector device may be so formed as to provide an elbow-like connection for joining tubular members 26 in angular relation. In this case the body members of the connector are provided with curved mid-sections 15', but otherwise are the same in structure as above described, and as is indicated by the application of the same reference characters to corresponding parts thereof.

As shown in Fig. 8, the connector device may be so formed as to provide for the coupling of tubular members in intersecting relation, as e. g. in crossing relation or in T-shaped relation. In such case the body members include right angled mid-sections 15'', but otherwise are the same in structure as above described, and as is indicated by the application of the same reference characters to corresponding parts thereof.

Although it is not absolutely essential so to do, it is desirable to provide the assembly of elements making up the novel connectors of this invention with means for initially retaining the same in operative assembled relation so as to provide an easily handled and easily manipulatable connector unit. There are various ways of attaining this result. Illustrative of one such arrangement thereof, in Figs. 10 to 12 of the drawings, the ends of the gripper sections 16 are provided with recesses 27 forming thereabout circumferential flanges 28 having suitably disposed openings 29. The wedge members 21 are provided at their extremities with an opening 30, which when said wedge members occupy initial retracted positions align themselves with said flange openings 29. A tie-wire 31 is threaded through the aligned openings 29—30, to extend diametrically across each end of the assembled body members; the free end portions 32 of said tie-wire being turned back across the ends of the assembly and then twisted together as at 33, thus tying the assembled parts together in their operative relation one to another. It will be obvious that when so tied together the several parts making up the connector will not be separated or lost one from another, while at the same time they are retained together in properly assembled relation ready for use, and in such manner that their application in use is conveniently facilitated, the gripper sections being insertable into the ends of tubular members 26 to be joined without necessity for removing the tie-wire 31. When so inserted, the driving of the wedge members 21 will easily and quickly break the tie wires (see Fig. 12), so that tightening home of said wedge members 21 will not be interfered with.

Another way of uniting the parts of the novel connectors in initial assembled relation is shown in Figs. 13 and 14. In this arrangement, the extremities of the gripper sections 16 are provided with longitudinally projecting perforate tongues or lugs 34 and the tip of the wedge members are initially disposed between said tongues or lugs, the same being provided with openings 35 to match the tongue or lug perforations so that a tie-wire 36 may be passed through these adjoined parts, and its ends turned about the extremities thereof and twisted together as at 37. It will be obvious, that on driving the wedge members, the tie wires 36 will be easily broken or cut so as to free the wedge members for operative driven advance between the gripper sections cooperative therewith.

Other ways of uniting the parts of the connector in initial assembled relation may be used, it being preferable, however, that the means used for this purpose be subject to release merely by the act of driving home the wedge members.

While I have described the connector devices as of cross sectional shapes to conform to and enter in the ends of round tubular members, it will be understood that the cross sectional shape of the connector devices may be made to conform to the tubular members of polygonal cross section when used to join the latter.

It will be understood that other changes could be made in the shape forms of the connector devices, and that many apparently widely different variations of the structure thereof could be made without departing from the scope of this invention as defined in the following claims. It is therefore intended that all matter contained in the above description or shown in the accompanying drawings shall be interpreted as illustrative and not in a limiting sense.

I claim:

1. Means interposable the ends of tubular members to join the same in coupled relation comprising, laterally opposed body members having gripper sections to enter the ends of tubular members to be joined, internal longitudinally disposed slidable wedge members intermediate said gripper sections adapted when driven axially forward therebetween to force the same into gripping relation to the internal surfaces of the walls of said tubular members, and tie means interconnecting the forward extremities of said body and wedge members in initial assembled relation with the wedge members retracted ready for driving.

2. Means interposable the ends of tubular members to join the same in coupled relation comprising, laterally opposed body members having gripper sections to enter the ends of tubular members to be joined, wedge members intermediate said gripper sections adapted when driven forward therebetween to force the same into gripping relation to the internal surfaces of the walls of said tubular members, breakable tie means engaged through associated ends of said gripper sections and intermediate wedge members operative to hold said body and wedge members in initial assembled relation with the wedge members retracted ready for driving, said tie means being adapted to be broken and released by the forward movements of said wedge members when the latter are operatively driven.

3. Means interposable the ends of tubular members to join the same in coupled relation comprising, laterally opposed body members each comprising a mid-section and oppositely extending gripper sections, said gripper sections being insertable into the ends of tubular members to be joined, wedge members intermediate said opposed gripper sections adapted when driven forward therebetween to force the same into gripping relation to the internal surfaces of the walls of said tubular members into which they extend, and said mid-sections having transversely open recesses at their inner opposed sides to provide an intermediate opening to give access to the heads of said wedge members to permit driving of the latter.

4. Means interposable the ends of said tubular members to join the same in coupled relation comprising, laterally opposed body members each comprising a mid-section and oppositely extending gripper sections, said gripper sections being insertable into the ends of tubular members to be joined, wedge members intermediate said opposed gripper sections adapted when driven forward therebetween to force the same into gripping relation to the internal surfaces of the walls of said tubular members into which they extend, said mid-sections having transversely open recesses at their inner opposed sides to provide an intermediate opening to give access to the heads of said wedge members to permit driving of the latter, and said wedge members having at their head end means engageable to impart retractive releasing movement thereto when desired.

5. Means interposable the ends of tubular members to join the same in coupled relation comprising, laterally opposed body members each comprising a mid-section and oppositely extending gripper sections, said gripper sections being insertable into the ends of tubular members to be joined, wedge members intermediate said opposed gripper sections adapted when driven forward therebetween to force the same into gripping relation to the internal surfaces of the walls of said tubular members into which they extend, said mid-sections having transversely open recesses at their inner opposed sides to provide an intermediate opening to give access to the heads of said wedge members to permit driving of the latter, and breakable tie means engaged through associated ends of said gripper sections and intermediate wedge members operative to hold said body and wedge members in initial assembled relation with the wedge members retracted ready for driving, said tie members being adapted to be broken and released by the forward movements of said wedge members when the latter are operatively driven.

6. Means interposable the ends of tubular members to join the same in coupled relation comprising, laterally opposed body members each comprising a mid-section and oppositely extending gripper sections corresponding in external conformation to the internal conformation of tubular members to be joined and insertable into the ends of the latter, wedge members intermediate opposed gripper sections, the inner faces of said gripper sections extending in angular planes corresponding to the angular planes of the wedge member faces, and said mid-sections having transversely open recesses at their inner opposed sides to provide an intermediate opening to give access to the heads of said wedge members to permit driving of the latter, and stop shoulders at the junctures of said gripper and mid-sections against which the adjoined end portions of the tubular members to be coupled may abut.

7. Means interposable the ends of tubular members to join the same in coupled relation comprising, laterally opposed body members each comprising a mid-section and oppositely extending gripper sections corresponding in external conformation to the internal conformation of tubular members to be joined and insertable into the ends of the latter, wedge members intermediate opposed gripper sections, the inner faces of said gripper sections extending in angular planes corresponding to the angular planes of the wedge member faces, and said mid-sections having transversely open recesses at their inner opposed sides to provide an intermediate opening to give access to the heads of said wedge members to permit driving of the latter, stop shoulders at the junctures of said gripper and mid-sections against which the adjoined end portions of the tubular members to be coupled may abut, and tie members for holding said body and wedge members in initial assembled relation with the wedge members retracted ready for driving.

ROBERT G. GOODYEAR.